Oct. 29, 1935.  W. K. TUCKER  2,019,030
METHOD OF PREPARING MARASCHINO TYPE CHERRIES
Filed April 2, 1934
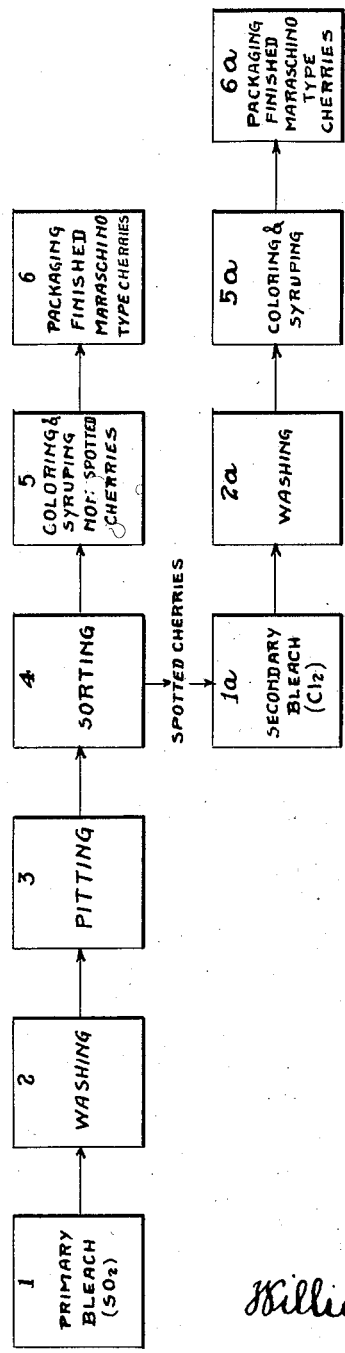

UNITED STATES PATENT OFFICE 2,019,030

METHOD OF PREPARING MARASCHINO TYPE CHERRIES

William K. Tucker, Berkeley, Calif., assignor to California Packing Corporation, San Francisco, Calif., a corporation of New York Application April 2, 1934, Serial No. 718,552

6 Claims. (Cl. 99—11)

This invention relates to a method of preparing maraschino type cherries, and is more particularly related to a method of conditioning the cherries as to color and texture.

Historically, this type of cherry was supposed to have been first made in the Dalmatian Mountains, where the native sour cherries (Marasca) were preserved in brandy and cordial made from the same Marasca cherries. Cherries made elsewhere in the same manner, or in a manner to simulate the original maraschino cherries, are designated as maraschino type cherries, to which this application relates.

In preparing maraschino type cherries, the cherries are first treated in a bleaching solution containing appoximately 1% sulphurous acid, or are subjected directly to the action of sulphur dioxide fumes. Whatever the particulars of the method used, it is essentially a bleaching process during which the reds of the cherries are bleached. When the cherries are not ripe and have no color, this process turns them into a canary or straw yellow color.

If there are any such marks as bruise marks from the wind, handling, sunburn, or the like, this reducing agent will not bleach out the stains of these colors produced in the bruised portions of the fruit. These off-color cherries will not dye uniformly and are therefore of very inferior quality.

It is therefore an object of my invention to provide a method of preparing maraschino type cherries so that all cherries will be of a uniform color and texture and will dye uniformly to thereby increase the quality of the cherries prepared and the value of the cherries to the packer.

Another object of my invention is to produce a method of preparing cherries of the maraschino type which includes the steps of subjecting the cherries to the action of a treating agent such, for example, as chlorine water, or a hypochlorite of sufficient strength to react to the coloring matter forming browns, yellows, or other discoloration of the cherries to produce cherries of uniform color, but of strength insufficient to materially damage the pulp or texture of the fruit.

Another object of my invention is to provide a method of preparing cherries of the maraschino type which includes the steps of subjecting the cherries to the action of a reducing agent to reduce the natural red color of the cherry and to the action of a secondary reagent effective for the removal of sun spots, bruise spots, or the like, remaining after the treatment of the reducing agent so that substantially all of the color is bleached from the cherries to produce cherries substantially free of spots and of uniform color, and which reagent is of such character in its reaction with the coloring matter forming the sun bruise marks or other discolorations remaining after the treatment of the reducing agent that the pulp or texture of the cherries is not injured or broken down or so that sloughing of the pulp of the fruit does not follow the treatment with the secondary agent.

Another object of my invention is to provide a method of preparing cherries of the maraschino type wherein following the customary reduction of the natural red coloring matter of the cherries, cherries are submitted to the action of a secondary reagent providing chlorine in a form available for reaction with the remaining coloring matter of the cherries so that such coloring as has been produced in the pulp of the cherries by sun, wind, or other bruises, is bleached from the cherries.

Other objects of this invention it is believed will be apparent from the following detailed description of the preferred embodiment thereof.

In the drawing I have diagrammatically illustrated the process embodying my invention.

I have discovered that in the preparation of maraschino type cherries, cherries substantially free from spots and of substantially uniform color may be prepared and that all color spots or portions of the cherries may be bleached from the cherries to produce cherries the texture or pulp of which is not materially altered by the treating of the cherries after they have been first subjected to the ordinary reducing action or process as commonly heretofore employed with a secondary bleaching agent which will unite with the coloring matter remaining after the reduction of the coloring matter of the cherries, and that among such secondary treating reagents are the chemical agents which make available chlorine such, for example, as chlorine water, hypochlorites, and the like.

I have also discovered that the spots remaining after the reduction of the natural red coloring matter from the cherries may be effectively bleached therefrom by secondary bleaching agents which are most effective in neutral or acid solutions and that secondary bleaching agents which are dependent for their bleaching action upon being utilized in solutions of an alkaline character can not be successfully employed without encountering the danger of the pulp of the cherries sloughing away under the influence of the secondary bleaching agent in an alkaline solution.

In accordance with the preferred process embodying my invention, the cherries are first subjected at 1 to the action of sulphur dioxide either in solution as sulphurous acid or under the influence of fumes of sulphur, or a solution of sulphurous acid salts to bleach the natural organic coloring matter of the cherries to the corresponding leuco base.

In accordance with this process as commonly followed, cherries, preferably white and unripe, are bleached in a solution containing approximately 1% sulphurous acid calculated as sulphur dioxide. The strength of this solution may vary from 0.5% to 2.0%. The solution may also be varied by some metal, such as calcium (lime) or soda, being added. In such case the preserving solution may be in part or in whole calcium bisulphite or sodium bisulphite. Under usual manufacturing conditions, a small amount of calcium hydroxide is added to the sulphurous acid solution and no doubt the preserving solution is a mixture of calcium sulphite and lime or so-called calcium bisulphite, etc. Again in some processes the cherries are allowed to come in contact with the fumes of burning sulphur for a proper period of time and then placed in a solution of salt (NaCl).

Whatever the details of the primary bleaching method utilizing the reducing agents as above set forth, the process has for its object the removal of the natural color from the cherries and the preservation of the fruit until it is ready for processing. "Cherries in brine" as thus produced is an article of manufacture and is often sold in this condition. When carrying out the process above defined of subjecting the cherries to the action of reducing agents, cherries which are not ripe and have no color are turned by this process or bleach into a canary or straw yellow color. The marks on the cherries such as bruise marks from the wind, handling, sunburn, or the like, are not removed by the reducing process. If the cherries have started to ripen so that they have red cheeks, as in the case of "Royal Anne" cherries, they will not be entirely bleached but will sometimes show dark yellowish brown spots where the reddish color had been before bleaching, and a light straw yellow background.

The cherries containing the spots as above set forth, either from the wind, handling, sunburn, or the like, where the reducing action has failed properly to reduce away the red coloring matter, will not take dye uniformly nor process into first class maraschino cherries but will always show spots through the artificial coloring matter. Such cherries are known to the trade as "whole and spotted" and command a price from one-quarter to one-third that of perfect cherries.

In accordance with the process embodying my invention, the cherries, after the primary reduction, are washed free at 2 of sulphur dioxide, then pitted at 3, and sorted at 4. The spotted cherries are then subjected at 1ª to the action of the secondary bleaching agent, the strength and character of which are sufficient to remove the stains or coloring matter due to the use of riper fruits, or marks produced by wind, handling, sunburn, or the like, and which secondary bleaching agent is of sufficient strength to not materially injure the fiber of the fruit. The most effective of such secondary bleaching agents I have found to be chlorine or reagents from which chlorine is freed in solution such, for example, as sodium hypochlorite and the like. The secondary bleaching agents which may be utilized for carrying out the secondary bleaching away of the spots of the "whole and spotted cherries" are principally such oxidizing agents as are effective in neutral or acid solutions such as chlorine and water, sodium or calcium hypochlorite, or other reagents including chlorine in its available form, and the like. Oxidizing agents which depend for their oxidizing action upon the presence of an alkaline or neutral solution such, for example, as hydrogen peroxide, sodium perborate, and the like, are not effective for the removal of spots from the "whole or spotted cherries" without causing sloughing of the cherry pulp or disintegration of the cherries, and it is not believed that these agents could be used commercially for the removal of the spots from "whole or spotted cherries".

After the cherries have been subjected to the secondary bleaching action at 1ª, they are washed again as indicated at 2ª, or they may be placed in a brine of salt (NaCl) and sold in that condition. When they are utilized for the purpose of producing the maraschino type cherries, they are washed as at 2ª and after being washed, are placed in suspension in a dilute sugar solution containing the proper amount of coloring matter.

The cherries are sorted at 4 and the unspotted cherries are colored or dyed at 5 and are packaged at 6 or are sold without coloring as maraschino type cherries ready for dyeing, as desired.

The spotted cherries separated at 4 from the unspotted cherries are then subjected to a secondary bleach 1ª, and as an illustrative example, the manner in which my invention is carried out utilizing, for example, sodium hypochlorite, I proceed preferably as follows:

"Whole and spotted" cherries, after they have been washed free of the primary reducing agent such as $SO_2$, are placed in a solution of sodium hypochlorite, utilizing preferably about one-half per cent, or its equivalent, in free chlorine. The cherries are allowed to remain in this solution until the bleach becomes complete. Small amounts of chlorine, or chlorine compounds, may be added to the bleach if necessary to fortify the solution so that the concentration is kept constant despite the addition of water from the washed fruit or the loss of chlorine by volatilization. I prefer, when carrying out this secondary bleaching, to use an acid such as acetic acid, to slightly acidify the solution, as the use of an acid causes the secondary bleach to proceed more rapidly and more effectively, and to produce cherries which are of a more uniform and lighter color than where the solution is not made acid. After a sufficient length of time, the "whole and spotted" cherries bleach from a straw yellow to a more or less transparent white, according to the chlorine compound selected. For example, sodium hypochlorite, in the presence of an acid, gives the cherries a more transparent appearance than cherries prepared with calcium hypochlorite or with chlorine gas (dissolved in water).

The cherries produced when using chlorine in water in the presence of an acid are whiter and more opaque. The effect of other oxidizing agents effective in an acid solution or a neutral solution vary slightly from that of hypochlorite or free chlorine, but each operates to remove or bleach from the cherries the color remaining after the cherries have been subjected to the primary color reduction, utilizing sulphurous acid, sulphur dioxide, or other reducing agents.

In accordance with my invention, after the cherries have been sufficiently bleached, the chlorine or hypochlorite is removed from the cherries by washing with water at 2ª.

There are many variations that can be made in the method of removing the coloring matter by the use of the above set forth oxidizing agents. The strength of the oxidizing agent may be varied and can be changed to meet the particular grade and type of cherries treated. It is usually found, however, that calcium or sodium hypochlorite, equivalent to 1% chlorine (compared to the weight of the cherries) is sufficient to carry out the process of oxidizing the remaining coloring matter from the cherries.

As the process of the secondary bleach is generally slow, it is preferably carried out by subjecting the cherries to successive treatments of batches of calcium or sodium hypochlorites, wherein a solution of approximately 0.33% is used, with the addition of an equal amount of calcium or sodium hypochlorites on each of three successive days to give a total of three applications of hypochlorites or equivalent oxidation in the cherries in the amount of 1% chlorine.

After the treatment with the secondary bleaching agent, it is sometimes advisable to again treat the cherries with sulphurous acid in the manner of the original treatment with the reducing agent, and in my preferred process, after the secondary bleaching agent has been thoroughly washed from the cherries, the cherries are again treated in a sulphurous acid solution and allowed to stand in this sulphurous acid solution for a few days. Following the subsequent treatment of the sulphurous acid, the cherries are washed free from the sulphur dioxide to where there is no more than a trace of sulphur dioxide left in the cherries. The cherries are then colored or dyed at 5ª or sold as maraschino type cherries ready for dyeing, as desired.

In brief, my invention consists in the preparation of maraschino type cherries where the cherries are subjected to the action of a reducing agent and a secondary bleaching agent which acts to remove the spots and color left after treatment with the reducing agent, in washing the cherries free of the reducing agent before they are subjected to the secondary bleaching action, and in the use of a secondary bleaching agent which will bleach away the color remaining after the primary bleach without causing sloughing or deterioration of the pulp of the cherries, and in the carrying out of this secondary bleaching, either in a neutral or acid solution, where it is found most effective.

Having fully described my invention, it is to be understood that I do not wish to be limited to the details herein set forth, but my invention is of the full scope of the appended claims.

I claim:

1. A method of preparing maraschino type cherries which includes the steps of subjecting the cherries to the action of sulphur dioxide to reduce the natural organic coloring matter of the cherries, washing the cherries free of the sulphur dioxide, and then treating the cherries with a solution of hypochlorite to bleach the remaining colors of the cherries.

2. A method of preparing cherries which includes the steps of subjecting cherries to the action of the sulphur dioxide to reduce the natural organic coloring matter of the cherries, washing the cherries free of the sulphur dioxide, and then treating the cherries with an acid solution of hypochlorite to bleach the remaining colors of the cherries.

3. A method of preparing maraschino type cherries which includes the steps of subjecting the cherries to the action of sulphur dioxide to reduce the natural organic coloring matter of the cherries, freeing the cherries of the sulphur dioxide, and then treating the cherries with a mild solution of sodium hypochlorite.

4. A method of preparing maraschino type cherries which includes the steps of subjecting the cherries to the action of sulphur dioxide to reduce the natural organic coloring matter of the cherries, freeing the cherries of sulphur dioxide, and then treating the cherries with a mild solution of calcium hypochlorite.

5. A method of preparing maraschino type cherries which includes the steps of subjecting the cherries to the action of sulphur dioxide to reduce the natural organic coloring matter of the cherries, washing the cherries free of the sulphur dioxide, and then treating the cherries in an acid solution of sodium hypochlorite to bleach the remaining colors of the cherries.

6. A method of preparing maraschino type cherries which includes the steps of subjecting the cherries to the action of sulphur dioxide to reduce the natural organic coloring matter of the cherries, washing the cherries free of the sulphur dioxide, and then treating the cherries in an acid solution of calcium hypochlorite to bleach the remaining colors of the cherries.

WILLIAM K. TUCKER.